United States Patent [19]
Kasahara et al.
[11] Patent Number: 4,789,223
[45] Date of Patent: Dec. 6, 1988

[54] MATRIX-ADDRESSED LIQUID CRYSTAL DISPLAY DEVICE WITH COMPENSATION FOR POTENTIAL SHIFT OF PIXEL ELECTRODES

[75] Inventors: Koichi Kasahara, Yokohama; Toshio Yanagisawa, Tokyo; Motoji Kajimura, Yokohama, all of Japan

[73] Assignee: Kabushiki Kaisha Toshiba, Kawasaki, Japan

[21] Appl. No.: 844,570

[22] Filed: Mar. 27, 1986

[30] Foreign Application Priority Data

Mar. 28, 1985 [JP] Japan .................................. 60-61858

[51] Int. Cl.[4] .................................................. G02F 1/13
[52] U.S. Cl. ...................................... 350/333; 340/784
[58] Field of Search ..................... 350/332, 333, 350 S, 350/334; 340/784, 765, 805, 811, 813–814

[56] References Cited

U.S. PATENT DOCUMENTS

| | | | |
|---|---|---|---|
| 3,973,252 | 8/1976 | Mitomo et al. | 350/337 |
| 4,386,352 | 5/1983 | Nonomura et al. | 340/784 |
| 4,571,585 | 2/1986 | Stein et al. | 340/784 |
| 4,591,886 | 5/1986 | Umeda et al. | 350/350 S |
| 4,634,226 | 1/1987 | Isogai et al. | 350/350 S |
| 4,710,768 | 12/1987 | Takeda et al. | 340/784 |

FOREIGN PATENT DOCUMENTS

| | | | |
|---|---|---|---|
| 0112700 | 7/1984 | European Pat. Off. | 340/784 |
| 0144297 | 12/1978 | Japan | 340/765 |
| 0007344 | 1/1984 | Japan | 350/333 |
| 0119329 | 7/1984 | Japan | 350/332 |
| 0119328 | 7/1984 | Japan | 350/332 |
| 0140323 | 7/1985 | Japan | 350/332 |
| 0239711 | 11/1985 | Japan | 350/332 |
| 2120440 | 11/1983 | United Kingdom | 340/765 |

*Primary Examiner*—Stanley D. Miller
*Assistant Examiner*—Tai Van Duong
*Attorney, Agent, or Firm*—Finnegan, Henderson Farabow, Garrett and Dunner

[57] ABSTRACT

A matrix-addressed liquid crystal display device is constructed of a pair of substrates facing each other with liquid crystal cells arranged in n rows and m columns on one of the substrates. Switches included in each cell comprise field effect transistors with n address lines forming a common connection for the gate electrodes of the field effect transistors in each row and m signal lines forming a common connection for the drain electrode or source electrode of the field effect transistors in each column. A common electrode is arranged on the other substrate and a liquid crystal layer interposed between the substrates. An address line drive circuit supplies a sequential scanning signal to the n address lines; and, a signal line drive circuit supplies a display signal to the m signal lines.

An asymmetrical display signal is selected whereby the voltage applied cross the liquid crystal layer is controlled to be a pure AC signal with no DC component.

9 Claims, 6 Drawing Sheets

MATRIX-ADDRESSED LIQUID CRYSTAL DISPLAY DEVICE WITH COMPENSATION FOR POTENTIAL SHIFT OF PIXEL ELECTRODES

BACKGROUND OF THE INVENTION

The present invention relates to matrix-addressed liquid crystal display devices.

Recently there has been vigorous development of high density matrix-addressed liquid crystal display devices which have a large number of image elements used for image display. Such liquid crystal devices frequently make use of thin film transistor (TFT) arrays formed by the use of thin film integrated circuit technology on one side of a substrate.

FIG. 7 shows an example of the arrangement of a single picture element of a matrix-addressed liquid crystal display device. In this figure, a signal line X connected to the drain electrode D of a TFT 1 and an address line Y connected to the gate electrode G of the TFT 1 are arranged in an orthogonal relationship to allow for column and row scanning of elements. The source electrode S of the TFT 1 is connected to one end of the capacity $C_{GS}$ between the gate and display electrodes. The liquid crystal element is turned on due to the buildup of the capacity $C_{LC}$ of the liquid crystal cell responsive to the gate electrode of the TFT 1 and the source electrode combined with the display electrode. In a matrix-addressed display device with drive switching elements each consisting of an an amorphous Si thin film transistor, each of the capacities inherently provided in respective liquid crystal cells which constitute pixels only stores the charge and holds a signal potential during one scanning period. Therefore, since connecting discrete capacitors to such cells is unnecessary, the area on the substrate occupied by discrete capacitors results in reduction of the effective useful area as compared to the area not contributing to the picture element on the substrate.

On the other hand, the capacity $C_{GS}$ between the gate and source electrodes cannot be disregarded because the signal-hold capacity is reduced.

FIG. 8 is a waveform diagram which explains the drive signals for the image element shown in FIG. 7. In (a) of this figure, the solid line waveform represents the scanning signal voltage $V_Y$ supplied to the address line Y and the dotted line waveform represents the display signal voltage $V_X$ supplied to the signal line X. Further, (b) in the same figure represents the signal voltage $V_S$ which is held by charging the liquid crystal cell capacity $C_{LC}$. As shown in FIG. 8(*a*), the scanning signal voltage $V_Y$ has a frame scanning period $T_F$. Further, as 8(*a*) shows, the polarity of display signal voltage $V_X$ is inverted during every frame scanning period $T_F$ using the polarity inversion reference potential $V_B$ as the datum. When a scanning signal voltage $V_Y$ and a display signal voltage $V_X$ is supplied respectively to the address line Y and the signal line X, the liquid crystal cell voltage with the waveform shown in FIG. 8(*b*) is held in the liquid crystal capacity $C_{LC}$, giving rise to the level shift dV between the desired voltage entered and the holding voltage. Since the level shift dV is superimposed on the signal voltage Vs, a difference in voltage magnitude between positive and negative polarities is produced and the voltage alternately applied to each of the liquid crystal cell will be different. In other words, a DC component is introduced to the signal voltage Vs.

In more detail, the cell voltage drops below the desired reference voltage Vs by the level shift dV, at one voltage polarity and when the polarity is reversed, the cell voltage drops by the level shift dV below the reference voltage Vs.

A method disclosed in Japanese Patent Application Laid-open No. 59-119328 is provided to equalize the different voltages applied to the cell. By the method, the drain voltage of a thin film transistor is biased at a constant voltage corresponding to the level shift dV for compensating the dV component contained in the cell voltage. Alternatively, the level shift dV is compensated by applying a bias voltage equal to the left shift dV to the common electrode of the liquid crystal cell. However the level shift is not effectively compensated for by such a method.

The level shift dV is produced due to the existence of the capacity $C_{GS}$ between the gate and display electrodes and is give by the equation $$dV = \frac{C_{GS}}{C_{GS} + C_{LC}} \cdot V_G$$

taking $V_G$ as the amplitude of the scanning signal voltage $V_Y$. Hence, assuming d for the cell gap, A is the display electrode area, $e_{LC}$ is the dielectric constant of the liquid crystal material and $e_O$ is the vacuum dielectric constant, the liquid crystal capacity $C_{LC}$ can be given as $$C_{LC} = \frac{e_0 \cdot e_{LC}}{d} \cdot A$$

Since the dielectric constant for the liquid crystal material $e_{LC}$ changes with the orientation of the liquid crystal molecules representative to the applied voltage $V_S$, the capacitance can be given as a function of the applied voltage $V_S$ in the form $$C_{LC} = K_1 \cdot f(V_S).$$

Consequently, the level shift dV also will be a function of the applied voltage $V_S$ and can be given as $$dV = K_2 \cdot f(V_S).$$

$K_1$ and $K_2$ are constants. It is known, that in such image displays, the level shift dV will also assume different values when different values are adopted for the effective voltage applied to the liquid crystal cell.

FIG. 9 is a diagram for explaining this behaviour, the vertical axis V shows the display signal voltage $V_X$ and the value $V_S$ of the voltage applied to the liquid crystal cell. The solid lines $\overline{OP}$ and $\overline{ON}$ give the amplitudes of the display signal voltage $V_X$ extending from the black to the white level and has been shown as a straight line for the sake of convenience. Furthermore, the horizontal line $V_B$ passing through the point O shows the polarity inversion reference potential for the display signal. Where there is no level shift dV, the solid OP or ON projected onto the vertical axis is the voltage $V_S$ applied to the liquid crystal cell. The opposite common electrode potential of the liquid crystal cell in this case is the polarity inversion reference potential $V_B$.

But in practice, since there is a level shift dV in the case of twisted nematic (TN) type liquid crystal cells with parallel arranged polarizing filter to the nematic molecules, the points P and N corresponding to the white level shift respectively to points $P_1$ and $N_1$ and the point O corresponding to the black level shifts to point $O_1$. The fact that the size of the level shift $dV_{BL}$ of the point O corresponding to the black level is greater than the size of the level shift $dV_{WH}$ at points P and N corresponding to the white level is due to the fact that the dielectric constant of the liquid crystals is small. Thus the liquid crystal molecules are in a state close to perpendicular to the direction of the electric field and therefore the liquid crystal cell capacity $C_{LC}$ is small compared with points P or N corresponding to the white level. Consequently, if the point $O_1$ is set to the opposite common electrode potential $V_C$ of the liquid crystal cell, the voltage $V_S$ applied to the liquid crystal cell will have different values on the positive side and negative side (polarity inversion side) with respect to the opposite common electrode potential $V_C$ even though the display signal voltage has the same amplitude for positive and negative with respect to the polarity, inversion reference potential $V_B$. The effect of this is that a direct current is applied to the liquid crystal which is undesirable for the life of the liquid crystal and produces a flicker in the display because the fundamental frequency of the voltage $V_S$ applied to the liquid crystal cell is halved. Furthermore, when the opposite common electrode potential $V_C$ is increased above the condition shown in FIG. 9, a point is reached at which the flicker disappears, but at this condition tonal rendering in the display is lost and the ideal AC drive condition is not produced.

Even though the bias voltage corresponding to $dV_{WH}$ is applied to the source electrode or the drain electrode as described in the aforementioned No. 59-119328, it results in the characteristic similar to $V_s$ shown by the dotted line in FIG. 9, so and has the same problem as described above.

SUMMARY OF THE INVENTION

It is an object of the present invention to overcome the defects associated with the conventional devices and to provicde a matrix-addressed liquid crystal device with long life and superior tonal rendering as well as an absence of flicker.

In accordance with the present invention, a matrix-addressed liquid crystal display device has a pair of substrates facing each other; liquid crystal cells are arranged in n rows and m columns on one substrate; switches comprised of a field effect transistor each with a gate electrode, a drain electrode and a source electrode are used for each of the liquid crystal cells; n address lines form a common connection for the gate electrodes of the field effect transistors in each row; m signal lines form a common connection for the drain electrode or source electrode of the field effect transistors in each column; a common electrode is arranged on the other substrate; a liquid crystal layer is arranged between the substrates; an address line drive circuit supplies a sequential scanning signal to the n address lines; and, a signal line drive circuit supplies a display signal to the m signal lines.

The display signal supplied to the signal line has its polarity reversed during the frame scanning period, and the dislay signal amplitude of the one polarity constituting the positive potential side with respect to the polarity inversion reference potential and the display signal amplitude of the polarity constituting the negative potential side are set at different values.

The display signal amplitude, which causes the level shift attributable to the capacitance between the gate and display electrodes of the drive transistor and the liquid crystal cell capacitance is selected at different values for the positive and negative sides. As a result of the AC drive applied to the liquid crystal cell has substantially identical positive and negative amplitudes.

The ratio of the amplitude of positive to negative display signals is preferably selected in the range from 1.5 to 3 for maintaining high quality image.

DETAILED DESCRIPTION OF THE PREFERRED EMBODIMENT

Figure 1:
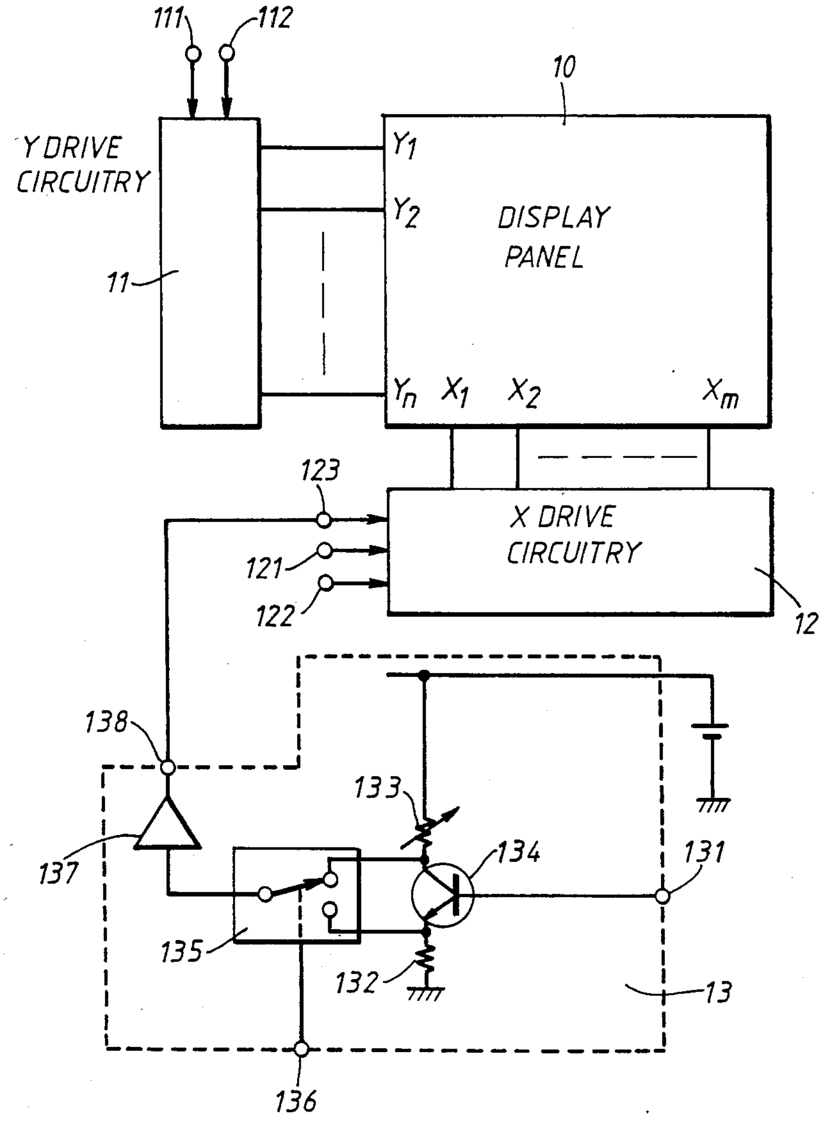
FIG. 1 is a schematic diagram showing one embodiment of the present invention.

The details of the present invention will now be explained in the following with reference to the figures.

FIGS. 1 to 6 show one embodiment of the present invention. As may be seen from FIGS. 1 and 2, in a liquid crystal display panel 10, there are arranged at equal intervals n address lines $(Y_1), \ldots, (Y_n)$ and m signal lines $(X_1), \ldots, (X_m)$ as a matrix.

A thin film field effect transistor 20 and a pixel 21 containing a picture display electrode is provided at each cross point between these lines. The address lines $(Y_1), \ldots, (Y_n)$ and signal lines $(X_1), \ldots, (X_m)$ are respectively connected to an address line drive circuit 11 and a signal line drive circuit 12. The address line drive circuit 11 generates a scanning signal in response to a vertical scanning start pulse and a vertical shift clock pulse which are applied to the input terminals 111 and 112 respectively and the scanning signal successively scans/drives the address lines $(Y_1), \ldots, (Y_n)$. Furthermore, the signal line drive circuit 12 generates a sample pulse in response to a horizontal scan start pulse and a horizontal shift clock pulse which are supplied to the input terminals 121 and 122 and the sample pulse converts the serial display signal supplied to the input terminal 123 into parallel signals by sample holding and drives the signal lines $(X_1), \ldots, (X_m)$. When one polarity display signal is input from the input terminal 131 to the base of the transistor 134 having a load resistance 132 and a variable load resistance 133 connected respectively to the emitter and collector in the polarity inversion circuit 13, a display signal of mutually reversed polarity is obtained from the emitter and collector. These display signals are input to a switch circuit 135 and by means of a switch control signal supplied to the control terminal 136 are selectively output as, for example, a display signal which reverses polarity every frame scanning period, and is supplied to the input terminal 123 of the signal line drive circuit 12 through the buffer amplifier 137 and the output terminal 138. Further, by means of the variable load resistance 133, it is possible to control the amplitude of the positive potential side of the display signal voltage with respect to the polarity inversion reference potential relative to the amplitude of the negative potential side. This may be replaced by a fixed load resistance of an appropriate value. In addition, the polarity inversion reference potential may be set by means of the base bias selected for the transistor 134. As far as the opposite common electrode potential is concerned, a voltage lower than the polarity inversion reference potential by the amount of the level shift $dV_{BL}$ may be imposed.

Figure 3:
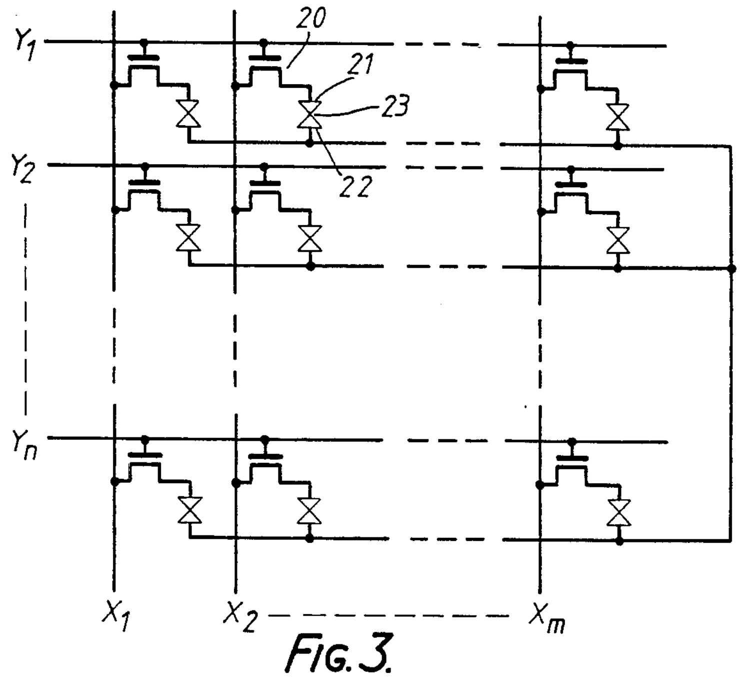
FIG. 3 is an equivalent circuit diagram showing an example of a field transistor array according to the present invention.

FIG. 3 is an equivalent circuit diagram showing the field effect transistors in this embodiment. An array of n channel TFTs having signal lines $(X_1), \ldots, (X_m)$ forming a common connection for the drain of the field effect transistors 20 in each column and address lines $(Y_1), \ldots, (Y_n)$ form a common connection for the gate of the field effect transistors in each row. Moreover, the sources of the field effect transistors 20 are electrically connected to the image display electrodes 21. The liquid crystal cell, i.e. the image element, is formed by this electrode 21, the opposite common electrode 22 and a liquid crystal layer 23 sandwiched between both electrodes 21 and 22. In this manner switches are provided for each of the liquid crystal cells disposed in n rows and m columns.

Figure 2:
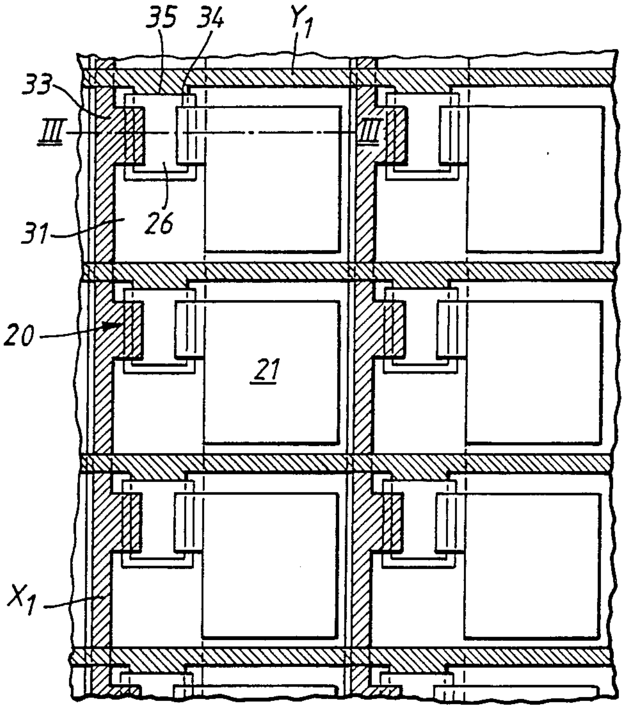
FIG. 2 is a plan view of a portion of a liquid crystal display panel of the embodiment of the invention.
Figure 4:
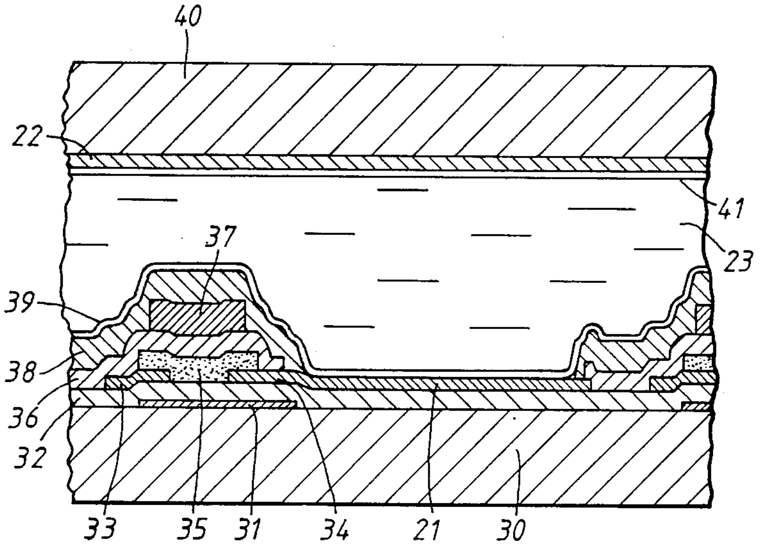
FIG. 4 is a sectional view of a liquid crystal cell taken along the line III—III of FIG. 2.

In FIGS. 2 and 4, the liquid crystal display panel is a TN type with the parallel arranged polarizing filter plate. A light shielding layer 31 is formed on a first transparent substrate 30 and an insulating film 32 is formed to cover this. Then, drain electrodes 33 connected to the signal lines $(X_1), \ldots, (X_m)$, source electrodes 34 connected to the image display electrodes 21 are formed on top of insulating film 32. A semiconductor layer 35, for example of amorphous silicon, is formed between drain electrodes 33 and source electrodes 34 located on top of light shielding layer 33, and gate electrodes 37 are formed integral with the address lines $(Y_1), \ldots, (Y_n)$ which are formed on top of semiconductor layer 35 with the aid of an insulating film 36. With the exception of the image element display electrodes 21 portions, are covered with a protective film 38, for example of polyimide, and a liquid crystal alignment layer 39 is formed on the image display electrodes 21 and the protective film 38. On the second transparent substrate 40, the opposite common electrode 22 and a liquid crystal alignment layer 41 are formed. In the case of color display panels, three primary color filters (not shown) are arranged between the substrate 40 and the opposite common electrode 22. Then the first transparent substrate 30 and the second transparent substrate 40 are sealed at the periphery, maintaining a gap of about 10 um and within this space the liquid crystal display panel 10 is formed by enclosing the liquid crystal layer 23.

The operation of the liquid crystal display panel 10 shown in FIG. 1 will be described next. The address lines $(Y_1), \ldots, (Y_n)$ are successively scanned and driven by means of a scanning signal from the Y driver, and assuming $T_F$ is the frame scanning period, the field effect transistors in each line are successively made conducting for a period $T_F/n$ only. If a display signal is simultaneously supplied to the signal lines $(X_1), \ldots, (X_m)$ in synchronism with this scanning, the voltage of this display signal will be successively applied to the capacitors in each line and held throughout the period $T_F$. This stored signal voltage is fed to the image display electrode 21 and excites the liquid crystal layer 23 between the electrode 21 and the opposite common electrode 22 in proportion to the display signal voltage.

The drive for this embodiment will now be described by reference to FIGS. 5 and 6.

Figure 5:
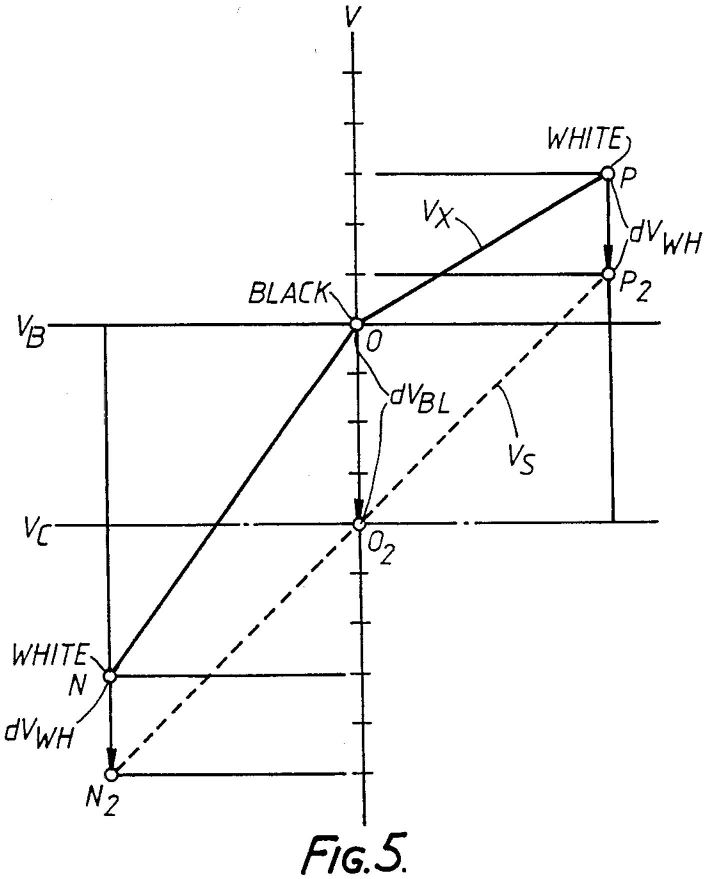
FIGS. 5 and 6 are diagrams for explaining a drive system according to the present invention.
Figure 9:
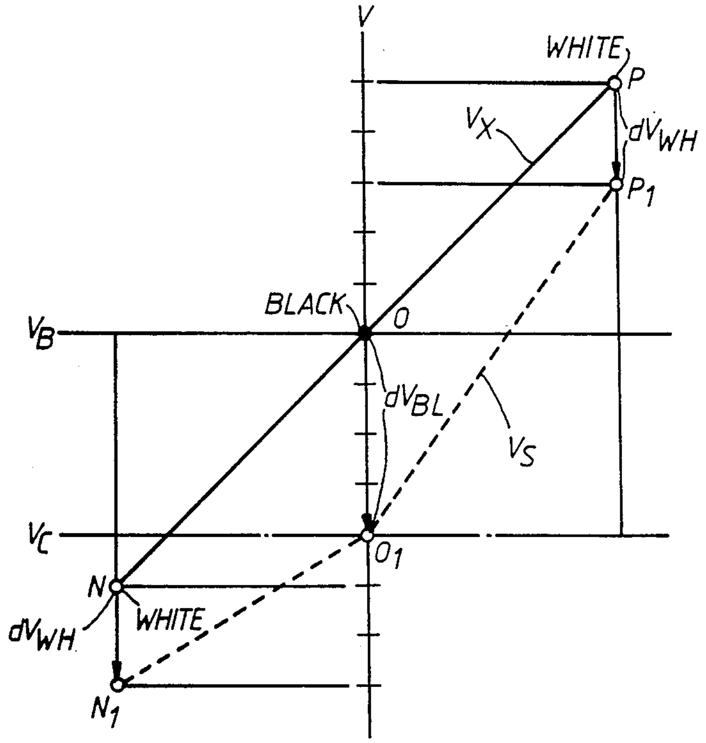
FIG. 9. (PRIOR ART)

FIG. 5 is a diagram similar to FIG. 9, the values for the display voltage $V_X$ supplied to the signal lines and the voltage $V_S$ applied to the liquid crystal cell being shown on the vertical axis V. Furthermore, the solid lines OP or ON give the display signal voltage $V_X$ from the black to the white level. The horizontal line $V_B$ passing through point O shows the polarity inversion reference potential for the display signal. In this embodiment, the display voltage $V_x$ supplied to the signal lines, allowing for the level shift $dV_{BL}$ and $dV_{WH}$ respectively at the black and white levels and the amplitude of the display signal voltage supplied to the signal lines are set at different values on the positive and negative potential sides with respective to the polarity inversion reference potential $V_B$, but the supplied voltage Vs to the liquid crystal cell has positive/negative synmmetry with respect to the opposite common electrode potential $V_C$. The actual voltage applied to the liquid crystal layer is Vs−Vc. That is to say, the amplitude at both polarities is a straight line passing through the opposite common electrode potential for an applied voltage of the required symmetry. The display signal voltage $V_X$ and the polarity inversion reference potential $V_B$ are obtained by superimposing the level shifts $dV_{BL}$ and $dV_{WH}$ at the black and white levels. In practical terms, the amplitude of the one polarity constituting the positive potential side is made smaller than the amplitude of the other polarity constituting the negative potential side.

The liquid crystal material used in this embodiment is PCH (phenyl-cyclo-hexane) type of which the dielectric constant or permittivity e || in the direction parallel to the molecular axis is 8 and the permittivity e⊥ in the direction normal to the molecular axis is 4, and $$e\| / e\perp = 2$$

$$\Delta e = e\| - e\perp = 4$$

where Δe is permittivity difference.

Referring to FIG. 5, assuming that the scale unit in the ordinate is 1 V, since $dV_{BL}$ is 4 V, $dV_{WH}$ is 2 V, and $V_B$ is taken as the origin, the voltage ratio of the positive and negative signal voltage obtained is obtained 7/3=2.3.

However, it is not desirable that the ratio be extremely large, therefore the liquid crystal material may be adopted so that the permittivity ratio e || /e⊥ should be in the practical range from 1.5 to 3.

Figure 6:
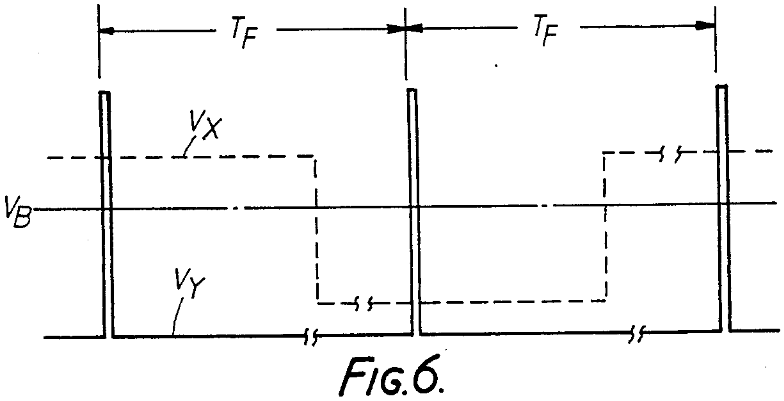
Figure 7:
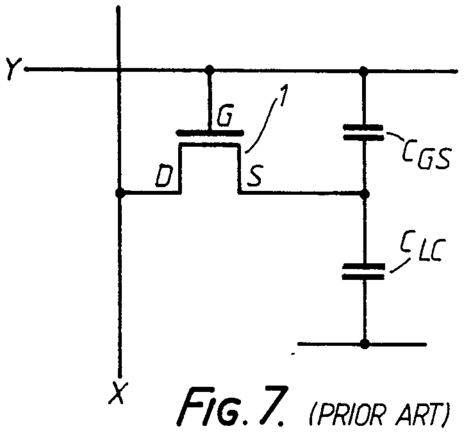
FIG. 7. (PRIOR ART)
FIG. 7 shows the circuit of one image element of a conventional matrix-addressed liquid crystal display device.
Figure 8:
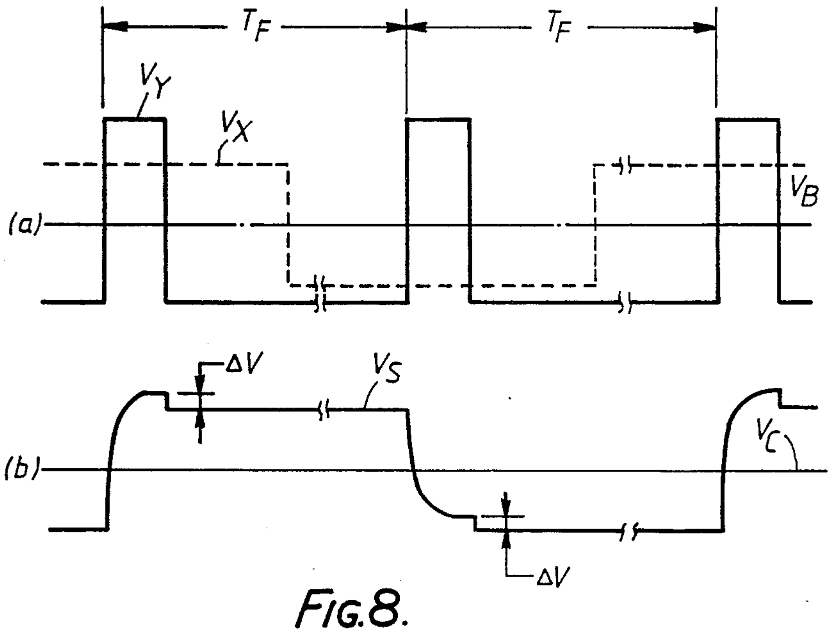
FIG. 8. (PRIOR ART)
FIGS. 8 and 9 are diagrams for the purpose of explaining a conventional matrix-addressed liquid crystal display device.

When a display signal voltage $V_X$ of this type having different amplitudes at each polarity, for example as shown in FIG. 6, is supplied to the signal lines, the points P and N corresponding to the white level shift to points $P_2$ and $N_2$ respectively and point O corresponding to the black level shifts to point $O_2$, due to the level shifts $dV_{WH}$ and $dV_{BL}$. Consequently, due to the fact that point $O_2$ is set at the opposite common electrodes potential $V_C$ for the liquid crystal, as may be seen from the dotted lines $\overline{O_2P_2}$ or $\overline{O_2N_2}$, a voltage $V_s$ symmetrical at each display level about the common electride potential $V_C$ is applied to the crystal cell. As a result, this embodiment has excellent tonal rendering an absence of flicker and preserves the long life of the liquid crystals.

Again, in FIG. 5, only the level shift dV at the black and white levels has been considered, but more precisely one ought to set the amplitude at each display level of the display signal voltage $V_x$ supplied to the signal line, including the intermediate levels, taking into account the gate and source electrodes of the field efect transistor and the liquid crystal cell capacity and the amplitude of the scanning signal supplied to the address lines. This is necessary when $\overline{OP}$ and $\overline{ON}$ are not straight lines.

Also, there is the matter of applying gamma correction to the display signal, allowing for the characteristics of the liquid crystal display device, and in this case also $\overline{OP}$ and $\overline{ON}$ will not be straight lines.

Hitherto, arrangements wherein the source and drain of a FET are connected to the picture element display electrode and signal line respectively have been employed but the connection of the source and drain is optional and it goes without saying that the reverse arrangement is also satisfactory. Further, where the field effect transistor is a complementary TFT pair made up of an n channel and p channel TFT it may be used in the same way as in the case of an n channel transistor, but where a p channel TFT is employed, the polarity of the voltage will be the reverse of that for the n channel TFT. In this case, as regards the display signal voltage supplied to the signal lines, the amplitude of the one polarity constituting the positive potential side with respect to the polarity reference potential will be greater than the amplitude of the other polarity constituting the negative potential side.

This invention also finds applicability to a liquid crystal display where a storage capacitance is in parallel with $C_{LC}$, but if it is small, it will change the effective value of $C_{LC}$. In this case, the equation expressing the level shift dV turns out $$dV = \frac{C_{GS}}{C_{GS} + C_{LC} + C_S} \cdot V_G$$

where $C_S$ expresses the storage capacitance.

In either case the present invention will be effective to produce good half tone images and an absence of flicker.

As has been set out in the foregoing, the matrix-addressed liquid crystal display device according to the present invention, is different from the conventional method applying the bias voltage to the polarity reference potential, using the present invention is possible to provide good tonal rendition and absence of flicker with long life for the array by virtue of the fact that the amplitude of the signal voltage supplied to the signal lines varies on the positive and negative potential sides with respect to the polarity reference potential in a compensatory way so that the voltage applied to the liquid crystal layer is made substantially the same positive and negative polarities.

Although this invention has been described in relation to a thin film transistor device, it will find application to any display array which has stray capacitance between its scanning electrode and its display electrode.

We claim:

1. A matrix-addressed liquid crystal display device for displaying half-tone pictures comprising:

a pair of substrates facing each other;

switch elements arranged in n rows and m columns on the first of said pair of substrates, each of said switch elements comprising a field effect transistor with a gate, drain and source;

pixel electrodes each connected to said source or drain of each of said field effect transistors;

n address lines forming a common connection for said respective gates of said field effect transistors in each row;

m signal lines forming a common connection for respective drains or sources of said field effect transistors in each column;

a common electrode arranged on the second of said pair of said substrates;

a liquid crystal layer interposed between said substrates, molecules in said liquid crystal layer being arranged in a predetermined alignment, the alignment being changed in accordance with the voltage applied to said liquid crystal layer, and the capacitance between said pixel electrode and said common electrode being changed in relation to said change of the alignment;

an address line drive circuit supplying sequential scanning signals to said n address lines;

a signal line drive circuit supplying parallel display signals to said m signal lines;

polarity inversion circuit means connected to said signal line drive circuit so that said parallel display signals possess a polarity inversion every frame scanning period;

wherein the amplitude of the display signals at one polarity constituting the positive potential side with respect to a polarity inversion reference potential and the amplitude of the display signals at the other polarity constituting the negative potential side are set at different values in order to compensate flor the potential shift of said pixel electrodes; wherein the potential shift depends on the ratio of parasitic capacitance, between said gate and said source or drain of said transistor and said liquid crystal layer capacitance, and between said pixel electrode and said common electrode, wherein said liquid crystal layer capacitance varies with the molecule alignment change owing to the display signal voltage applied to said liquid crystal layer.

2. The matrix-addressed liquid crystal display device according to claim 1 wherein said field effect transistors comprise n channel field effect transistors, and the amplitude of said display signal of the one polarity constituting the positive potential side with respect to said polarity inversion reference potential is made smaller than the amplitude of said display signal of the other polarity constituting the negative potential side.

3. The matrix-addressed liquid crystal display device according to claim 1 wherein said n channel field effect transistor are thin film transistors.

4. The matrix-address liquid crystal device according to claim 1 wherein said field effect transistors are comprised of pairs of complementary field effect transistors comprised of n channel and p channel field effect transistors.

5. The matrix-addressed liquid crystal display device according to claim 1 wherein said field effect transistors comprise p channel field effect transistors, and the amplitude of the display signal voltage of the one polarity constituting the positive potential side with respect to said polarity inversion reference potential is made greater than the amplitude of the signal voltage of the other polarity constituting the negative potential side.

6. The matrix-addressed liquid crystal display device according to claim 4 wherein said p channel field effect transistors are thin film transistors.

7. The matrix-addressed liquid crystal display device according to claim 1 wherein the ratio of the display signal amplitudes at each polarity is set so that the voltages applied to the liquid crystal layers have no DC voltage component.

8. The matrix-addressed liquid crystal display device according to claim 5 wherein the ratio of the greater to the lesser of the display signal amplitudes at each polarity is in the range of 1.5 to 3.

9. The matrix-addressed liquid crystal display device according to claim 5 wherein said source or drain is coextensive with the display electrode.

* * * * *